US008698875B2

(12) United States Patent
Anguelov et al.

(10) Patent No.: US 8,698,875 B2
(45) Date of Patent: Apr. 15, 2014

(54) ESTIMATION OF PANORAMIC CAMERA ORIENTATION RELATIVE TO A VEHICLE COORDINATE FRAME

(75) Inventors: Dragomir D. Anguelov, San Francisco, CA (US); Daniel Filip, San Jose, CA (US)

(73) Assignee: Google Inc., Mountain View, CA (US)

(*) Notice: Subject to any disclaimer, the term of this patent is extended or adjusted under 35 U.S.C. 154(b) by 801 days.

(21) Appl. No.: 12/708,302

(22) Filed: Feb. 18, 2010

(65) Prior Publication Data

US 2010/0220173 A1 Sep. 2, 2010

Related U.S. Application Data

(60) Provisional application No. 61/177,614, filed on May 12, 2009, provisional application No. 61/154,217, filed on Feb. 20, 2009.

(51) Int. Cl.
*H04N 7/00* (2011.01)
*H04N 7/18* (2006.01)

(52) U.S. Cl.
USPC .............. 348/36; 348/148; 348/135; 348/173

(58) Field of Classification Search
USPC ........ 348/36, 39, 44, 116, 148, 135; 340/435, 340/540, 995.24; 382/100, 10, 104, 103; 702/153, 301
See application file for complete search history.

(56) References Cited

U.S. PATENT DOCUMENTS

| 5,166,878 | A | 11/1992 | Poelstra |
| 5,517,419 | A | 5/1996 | Lanckton et al. |
| 6,594,600 | B1 | 7/2003 | Arnoul et al. |
| 6,993,450 | B2 * | 1/2006 | Takemoto et al. ............. 702/153 |
| 2004/0230375 | A1 * | 11/2004 | Matsumoto et al. .......... 701/301 |
| 2006/0012493 | A1 * | 1/2006 | Karlsson et al. ......... 340/995.24 |
| 2007/0288141 | A1 | 12/2007 | Bergen et al. |
| 2008/0089556 | A1 | 4/2008 | Salgian et al. |

(Continued)

FOREIGN PATENT DOCUMENTS

WO WO 95/32483 11/1995

OTHER PUBLICATIONS

The International Search Report cited in International Application No. PCT/US2010/024762, dated May 27, 2010, 7 pages.

(Continued)

*Primary Examiner* — Thao Le
*Assistant Examiner* — Long Le
(74) *Attorney, Agent, or Firm* — Lerner, David, Littenberg, Krumholz & Mentlik, LLP

(57) ABSTRACT

A system and method are presented for estimating the orientation of a panoramic camera mounted on a vehicle relative to the vehicle coordinate frame. An initial pose estimate of the vehicle is determined based on global positioning system data, inertial measurement unit data, and wheel odometry data of the vehicle. Image data from images captured by the camera is processed to obtain one or more tracks, each track including a sequence of matched feature points stemming from a same three-dimensional location. A correction parameter determined from the initial pose estimate and tracks can then be used to correct the orientations of the images captured by the camera. The correction parameter can be optimized by deriving a correction parameter for each of a multitude of distinct subsequences of one or more runs. Statistical analysis can be performed on the determined correction parameters to produce robust estimates.

26 Claims, 19 Drawing Sheets

(56) References Cited

U.S. PATENT DOCUMENTS

| | | | |
|---|---|---|---|
| 2008/0167814 A1 | 7/2008 | Samarasekera et al. | |
| 2009/0201361 A1* | 8/2009 | Lyon et al. | 348/36 |
| 2009/0285450 A1* | 11/2009 | Kaiser et al. | 382/103 |
| 2010/0118116 A1* | 5/2010 | Tomasz et al. | 348/36 |
| 2010/0208057 A1* | 8/2010 | Meier et al. | 348/135 |

OTHER PUBLICATIONS

The Written Opinion of the International Search Authority cited in International Application No. PCT/US2010/024762, dated May 27, 2010, 8 pages.

Zhu et al., "Precise Visual Navigation Using Multi-Stereo Vision and Landmark Matching," Proc. of SPIE, vol. 6561, (2007), 12 pages.

Khan et al., "Camera Calibration for a Robust Omni-directional Photogrammetry System," Internet Citation, May 31, 2007, 8 pages.

Chen, T., and Shibasaki, R., "A Versatile AR Type 3D Mobile GIS Based on Image Navigation Technology" *IEEE Xplore*, 1999, Downloaded Nov. 10, 2008, 6 pgs.

Newman, J., et al., "Augmented Reality in a Wide Area Sentient Environment", *Proceedings of the IEEE and ACM International Symposium on Augmented Reality (ISAR '01)*, IEEE Computer Society, Washington D.C., 2001, Downloaded from IEEE Xplore Jul. 13, 2009, 10 pgs.

Taylor, Camillo J., "VideoPlus: A Method for Capturing the Structure and Appearance of Immersive Environments", *IEEE Transactions on Visualization and Computer Graphics* 2:171-182, IEEE Computer Society, Washington D.C., 2002, 13 pgs.

Wagner, D., et al., "Pose Tracking from Natural Features on Mobile Phones", $7^{th}$ *IEEE International Symposium on Mixed and Augmented Reality Systems*, IEEE Computer Society, Washington D.C., 2008, 10 pgs.

Xu, W., et al., "Recording Real Worlds for Playback in a Virtual Exercise Environment", *Technical Report CU-CS 1013-06*, University of Colorado: Department of Computer Science, Boulder, Colorado, 2006, 12 pgs.

\* cited by examiner $R: (\varphi, \theta, \psi)$
(ROLL, PITCH, YAW)
⎵
413

$R: \overbrace{[q_0 \ q_1 \ q_2 \ q_3]}^{415}$

FIG. 4

$$F(P,X,R) = \sum_t \sum_i \rho((T_{P_i,R}(X_t) - I_{Xt}))^2 + \lambda \sum_i (P_i - P_{ESTi})^2$$

800

Where:

$P = P_1, P_2, ..., P_N$ and represents a set of vehicle poses;
$P_i$ represents a pose of a vehicle at time I;
$X = X_1, X_2, ..., X_M$ and represents three-dimensional locations of track points in a scene;
$X_t$ represents a three-dimensional location of track t in the scene;
R represents rotation of the camera;
$\rho$ denotes a robustifier function (e.g., a Cauchy robustifier);
T represents projection;
$I_{Xt}$ represents a fixed location in a given image, where a feature corresponding to track point $X_t$ was detected;
$\lambda$ represents a weight used to trade off strength of a first and a second term in F; and
$P_{ESTi}$ represents an initial or a previous pose estimate of the vehicle And:

$T_{P_i,R}(X_t) - I_{Xt}$ represents reprojection error; and
$P_i - P_{ESTi}$ represents pose error

FIG. 8

ESTIMATION OF PANORAMIC CAMERA ORIENTATION RELATIVE TO A VEHICLE COORDINATE FRAME

CROSS-REFERENCE TO RELATED APPLICATIONS

This application claims the benefit of priority to U.S. Provisional Patent Application No. 61/177,614, filed May 12, 2009, and to U.S. Provisional Patent Application No. 61/154,217, filed Feb. 20, 2009, both entitled "Estimation of Panoramic Camera Orientation Relative to a Vehicle Coordinate Frame," and both incorporated herein by reference in their entireties.

BACKGROUND

1. Field of the Invention

The present invention relates to camera-obtained imagery captured from a moving vehicle.

2. Related Art

A camera, such as a panoramic camera, can be mounted on a vehicle, such as a car, truck, van, or any kind of vehicle, and used to capture images as the vehicle moves. A panoramic camera is a camera, typically a system of one or multiple cameras, that is configured or arranged to capture a panoramic image (i.e., an image or view of an area in many directions, possibly every direction). Examples of a panoramic camera can include a single camera, a polycamera, a camera rosette, a rotating camera, etc. The captured images may be used for online navigation and viewing tools such as Google Inc.'s STREET VIEW tool, for example. Vehicles that use panoramic camera systems in this manner may also include other systems and devices for related data collection. For example, a data collection vehicle may include a Global Positioning System (GPS) and/or an Inertial Measurement Unit (IMU) sensor in addition to the camera system. It may also record the amount of rotation of the vehicle's wheels. These systems include sensors that can collect data, which can help estimate the location of the vehicle. Given the precise location of the vehicle, the captured images can be associated with and shown at those locations.

There is nontrivial variation in the way a panoramic camera system and GPS and IMU sensors are placed on, or within, a data collection vehicle. For example, there is little consistency in the placement of a camera rack on top of the vehicle roof. In addition, there is variation in how and where the GPS and IMU sensors are placed within the vehicle. Furthermore, cameras and camera racks are often replaced, or their configuration and/or positioning may be changed by human operators. In many applications, in order to correctly render a panoramic view, one needs to know how the ground plane and world coordinates relate to the image panorama that was captured by the panoramic camera. If this information is not known or inaccurate, objects (e.g., buildings) and their surroundings may appear incorrectly, e.g., tilted to one side. Furthermore, directional arrows that may be used in a viewing tool may point in a wrong direction. Thus, knowing the camera orientation relative to GPS and/or IMU sensors in a data collection vehicle can be important.

BRIEF SUMMARY

Embodiments of the invention relate to estimation of camera orientation relative to a vehicle coordinate frame. In one embodiment, a method for estimating orientation of a panoramic camera mounted on a vehicle may include determining an initial pose estimate of the vehicle based on global positioning system data, inertial measurement unit data, and wheel odometry data of the vehicle. The method may also include obtaining images from one or more runs of image data captured by the camera, the images each having an orientation. The method may further include processing image data from the images to obtain one or more tracks, where each track includes a sequence of matched feature points stemming from a same three-dimensional location. The method may also include determining, from the initial pose estimate and tracks, a correction parameter to correct the orientations of the images captured by the camera.

In another embodiment, a system for estimating orientation of a panoramic camera mounted on a vehicle is provided. The system may include a pose estimate module that generates an initial pose estimate of the vehicle based on global positioning system data, inertial measurement unit data, and wheel odometry data of the vehicle. The system may also include an image processing module that processes image data from one or more runs of image data captured by the camera to obtain one or more tracks, where each track includes a sequence of matched feature points stemming from a same three-dimensional location. The system may further include an optimizer module, in communication with the pose estimate module and the image processing module, that determines, from the initial pose estimate and tracks, a correction parameter to correct the orientations of the images. In an embodiment, the pose estimate module may be in communication with one or more vehicle databases having vehicle information such as global positioning system data, inertial measurement unit data, and wheel odometry data of the vehicle. In an embodiment, the image processing module may be in communication with one or more image databases having images and corresponding image data from the one or more runs of image data captured by the panoramic camera. In an alternative embodiment, the system can include the vehicle databases and/or the image databases.

In one embodiment, a computer program product includes a computer readable storage medium having control logic stored therein for causing a computer to estimate orientation of a panoramic camera mounted on a vehicle. The control logic may include a first computer readable program code that enables the computer to determine an initial pose estimate of the vehicle, the initial pose estimate based on global positioning system data, inertial measurement unit data, and wheel odometry data of the vehicle. The control logic may also include a second computer readable program code that enables the computer to obtain images from one or more runs of image data captured by the camera, the images each having an orientation. The control logic may further include a third computer readable program code that enables the computer to process image data from the images to obtain one or more tracks, where each track includes a sequence of matched feature points stemming from a same three-dimensional location. The control logic may also include a fourth computer readable program code that enables the computer to determine, from the initial pose estimate and tracks, a correction parameter to correct the orientations of the images captured by the camera.

Further embodiments, features, and advantages, as well as the structure and operation of the various embodiments, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIG. 4 shows exemplary ways of representing roll.

FIG. 8 shows a nonlinear equation for deriving a camera orientation correction parameter, according to an embodiment of the present invention.

Figure 1:
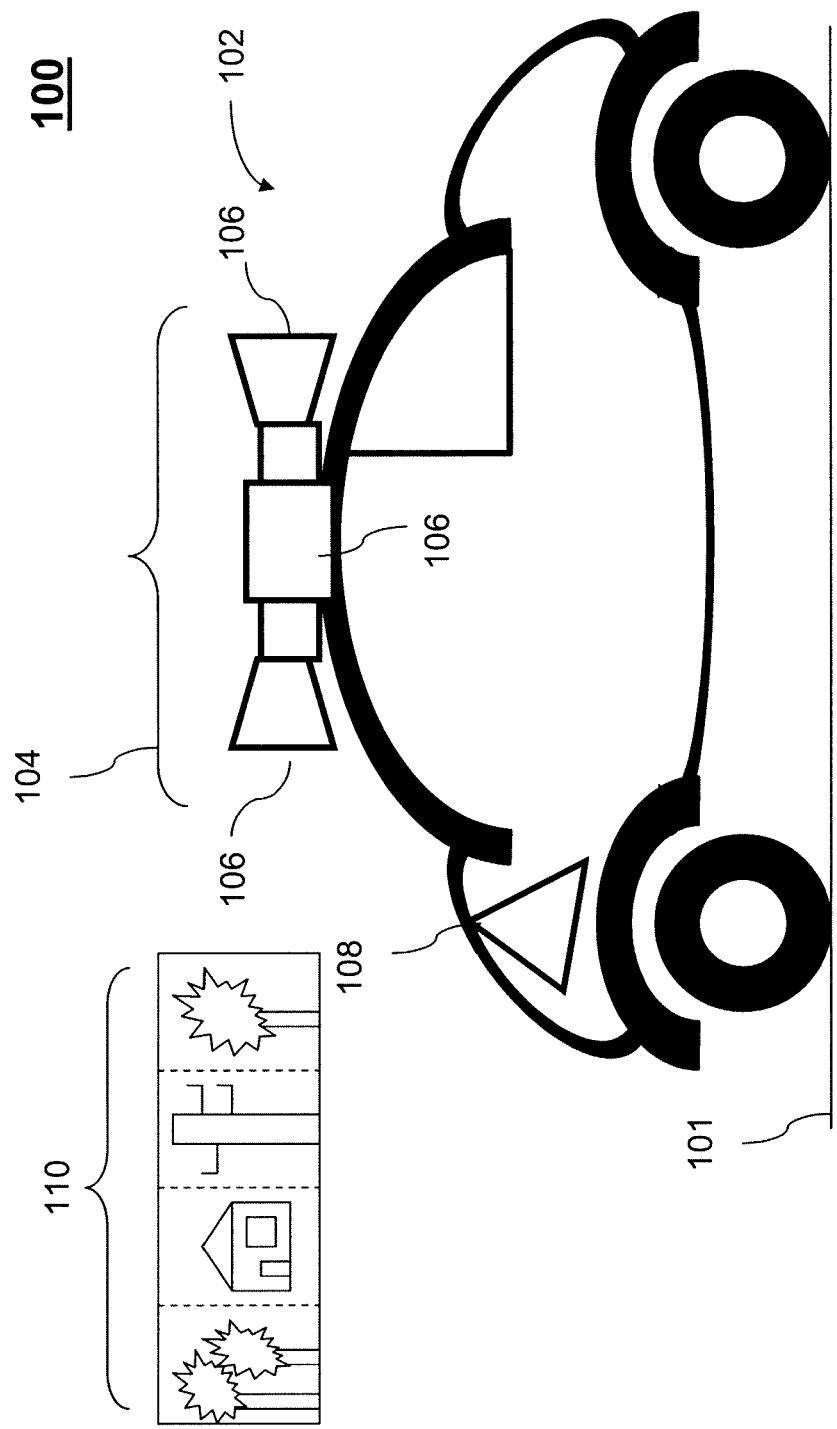
FIGS. 1-3 are exemplary diagrams depicting a vehicle with a panoramic camera mounted thereon.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF EMBODIMENTS

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to incorporate such a feature, structure, or characteristic in connection with other embodiments whether or not explicitly described.

TERMINOLOGY

The following provides definitions for certain terms as used in this document:

Panoramic Camera—A panoramic camera is a camera, or system of cameras, that is configured or arranged to capture an image or view of an area in one or many directions. Examples of a panoramic camera may include a single camera, a polycamera (a tightly-packed cluster of cameras providing a large field of view), a camera rosette (outward-facing equally-spaced cameras forming a circle that provide an all-around view), a rotating (or rotating line) camera (a camera that is rotated to capture images in multiple directions), etc.

GPS—Global Positioning System—The Global Positioning System (GPS) is a navigational system using satellite signals to determine the location of a radio receiver on or above the earth's surface.

IMU—Inertial Measurement Unit—An Inertial Measurement Unit is a position-tracking sensor that senses motion in terms of type, rate, and direction using a combination of accelerometers and gyroscopes.

World Coordinates—World coordinates are from the world coordinate system, which is a coordinate system that is fixed with respect to the Earth.

Pose—A pose may be defined as a three-dimensional position (e.g., in the x, y, z coordinate system) with an orientation (or rotation) that is usually referred to using rotation coordinates (e.g., roll ($\phi$), pitch ($\theta$), and yaw ($\psi$)). Therefore, a pose may be expressed in at least six dimensions: x, y, $\phi$, $\theta$, and $\psi$. The pose of the vehicle may be defined as a position and orientation of the vehicle relative to the world.

Feature Matching—Feature matching provides correspondence between feature points and images. Detected features from different camera images are matched using their appearance to find corresponding sets of features. Each set of matching features is assumed to be produced by the same entity, which has a certain three-dimensional position in the world. Matched feature points may be grouped into one or more tracks, each track including a sequence of matched feature points stemming from a single three-dimensional location. Feature detection and matching may be used for image alignment (e.g., stitching), three-dimensional reconstruction, motion tracking, etc.

Overview

Embodiments of the present invention are related to panoramic photography via a panoramic camera that is mounted on a vehicle. The embodiments are directed to optimizing orientation of images obtained via such a camera. Because the alignment of the camera may not be ideal, and the physical orientation, position, and/or location of the camera may not align with those of other related data collection sensors, such as a Global Positioning System (GPS) and/or an Inertial Measurement Unit (IMU) sensor, images obtained via the camera may be improved by applying the embodiments described herein. For example, embodiments may include the ability to automatically estimate the orientation of a camera mounted on a data collection vehicle relative to the data collection sensors.

The following description is broken down into a discussion of environment, orientation estimation, further optimization of orientation correction, system architecture, and methods of orientation estimation and optimization.

Environment

Figure 2:
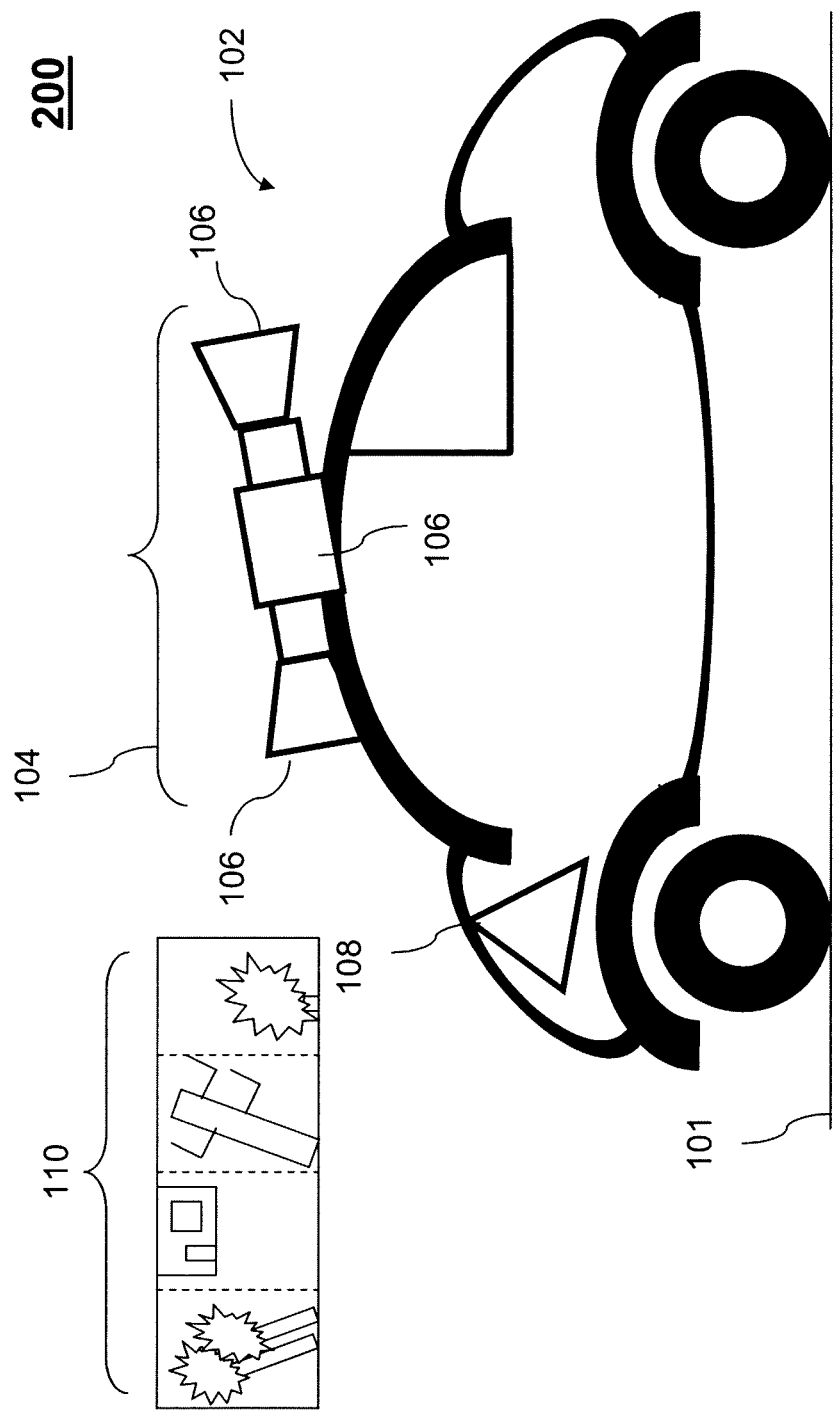
Figure 3:
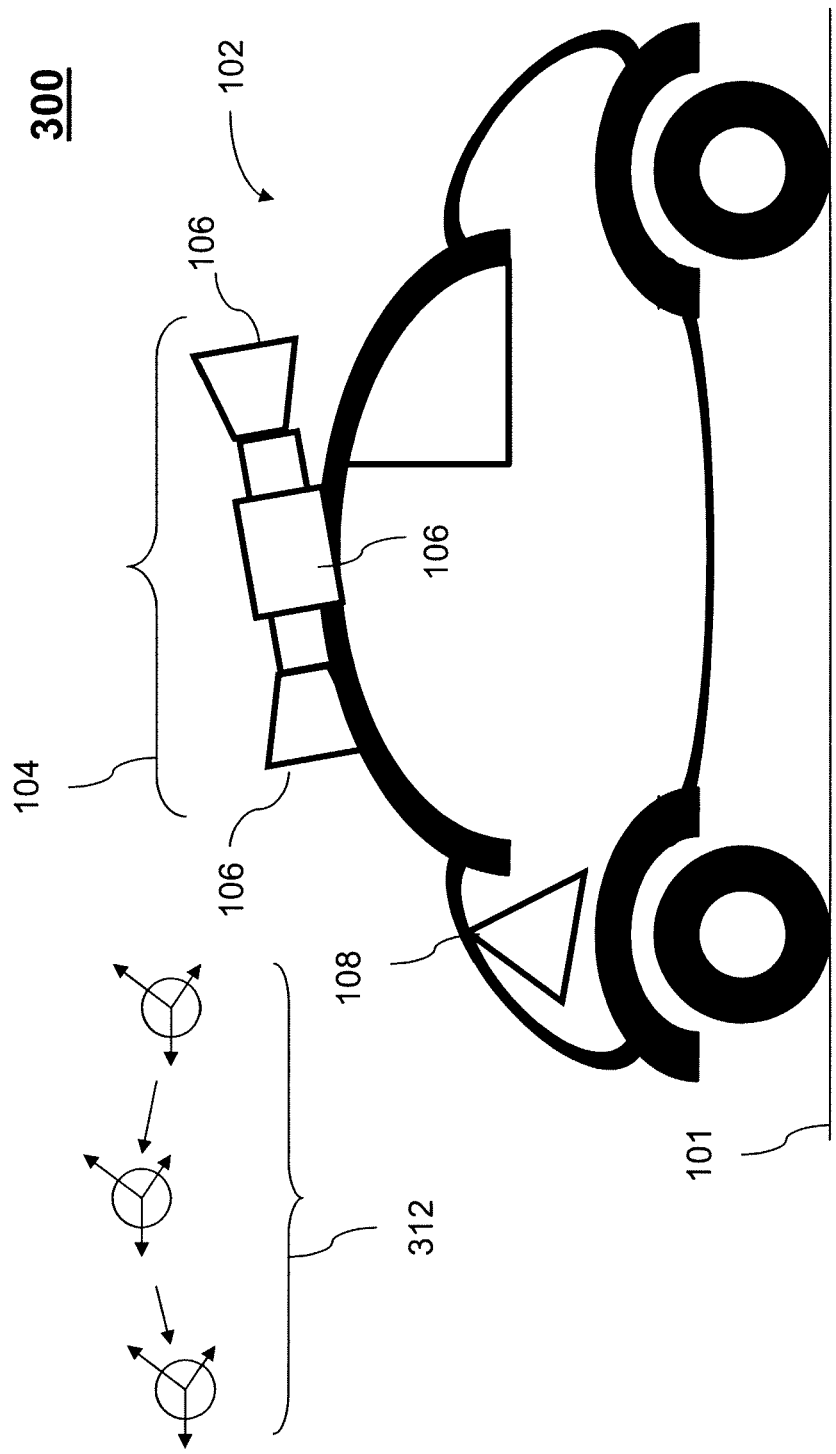

FIGS. 1-3 are exemplary diagrams depicting a vehicle 102 with a panoramic camera 104 mounted thereon. Panoramic camera 104 may be any type of panoramic camera as described earlier, e.g., a single camera, a polycamera, a camera rosette, etc. Panoramic camera 104 may include any number of cameras 106. In one example, panoramic camera 104 includes four to eight cameras. However, this is illustrative and not to be limiting, as fewer or more cameras may be used. Vehicle 102 may be used to collect image data and other data for navigation and viewing tools such as Google Inc.'s STREET VIEW tool.

In addition to panoramic camera 104, other sensors (not shown) may be used for data collection, such as, for example, a Global Positioning System (GPS) sensor and/or an Inertial Measurement Unit (IMU) sensor. These other sensors, as well as other related equipment, may be located in the trunk 108 of vehicle 102, or anywhere else within, on, or coupled to vehicle 102. In example 100 of FIG. 1, image 110 represents an example image obtained from panoramic camera 104. Each divided portion (denoted by dotted lines) may show an image captured by each of four cameras of panoramic camera 104, for example. In example 200 shown in FIG. 2, panoramic camera 104 is mounted in a skewed manner, and objects shown in image 210 obtained from camera 104 are tilted and/or displaced upward or downward relative to ground 101. As can be seen in FIG. 2, each image has a different displacement, depending on which camera of panoramic camera 104 captured each image. This is one example of incorrect image orientation due to a physically skewed camera. Another example may be that camera 104 is mounted on vehicle 102 in an even manner, but vehicle 102 is tilted. However, even if camera 104 was not physically skewed, image 210 may still contain skewed contents due to other conditions, such as inconsistent or unknown placement of related data collection sensors (e.g., a GPS sensor or an IMU sensor). Since sensor data is associated with captured images, this inconsistent or unknown placement of sensors can lead to skew in processing of the images to form a skewed panoramic image. Furthermore, a combination of these conditions may exist. As stated earlier, knowing the camera orientation relative to GPS and/or IMU sensors in a data collection vehicle can be important, as will now be discussed.

Generally, any three-dimensional object can be considered as having a six-dimensional pose. A pose may be defined as a three-dimensional position (e.g., in the x, y, z coordinate system) with an orientation (or rotation) that is usually referred to using rotation coordinates (e.g., roll ($\phi$), pitch ($\theta$), and yaw ($\psi$)), such as coordinate set 413 shown in FIG. 4, although rotation may be represented in other ways (such as quaternion 415 shown in FIG. 4). Thus, a pose may be expressed in at least six dimensions: x, y, z, $\phi$, $\theta$, and $\psi$. Referring to FIG. 3, the pose of a moving vehicle may be represented by, for example, a series of poses 312 of data collection vehicle 102. Each pose of the series of poses 312 is shown by a schematic representation including a circle with three arrows. This representation is meant to represent position (x, y, z) and orientation ($\phi$, $\theta$, $\psi$).

The pose of a moving vehicle may be defined in the above-described manner, with the coordinates constantly changing as the vehicle moves in a three-dimensional space and along uneven terrain (e.g., hilly and/or windy roads). Sensors placed in or on vehicle 102, such as GPS and/or IMU sensors, may assist in determining a pose of vehicle 102. Generally, GPS sensors use satellite data to determine location, speed, direction, and time. IMU sensors generally include a combination of accelerometers and gyroscopes, and may determine position by sensing acceleration and rotational attributes. When used as part of a navigational view capturing system, these sensors may provide information to determine how the ground plane and the world coordinates relate to an image, or image panorama, that is captured by one or more cameras of panoramic camera 104. This information is used to correctly render a panoramic view, for example. If this information is not known or inaccurate, objects (e.g., buildings, trees, etc.) and their surroundings may appear incorrectly or skewed, e.g., tilted to one side and/or displaced upward or downward relative to ground 101. Correction may then require orientation adjustment of the raw and/or rendered images. With a potential additional problem of mounted camera 104 not being aligned in a straight manner, this adjustment becomes even more important.

The above-discussed problems may be corrected by the embodiments discussed in the following description.

Orientation Estimation and Optimization

Embodiments as described below rely on the assumption that relatively accurate estimates of vehicle pose, and images for all cameras of a panoramic camera 104 mounted on the vehicle, are available for an uninterrupted data collection interval or run. With this data, accurate rotational alignment between the panoramic camera 104 and GPS/IMU sensors that were used to obtain the vehicle pose estimates may be determined.

Figure 5:
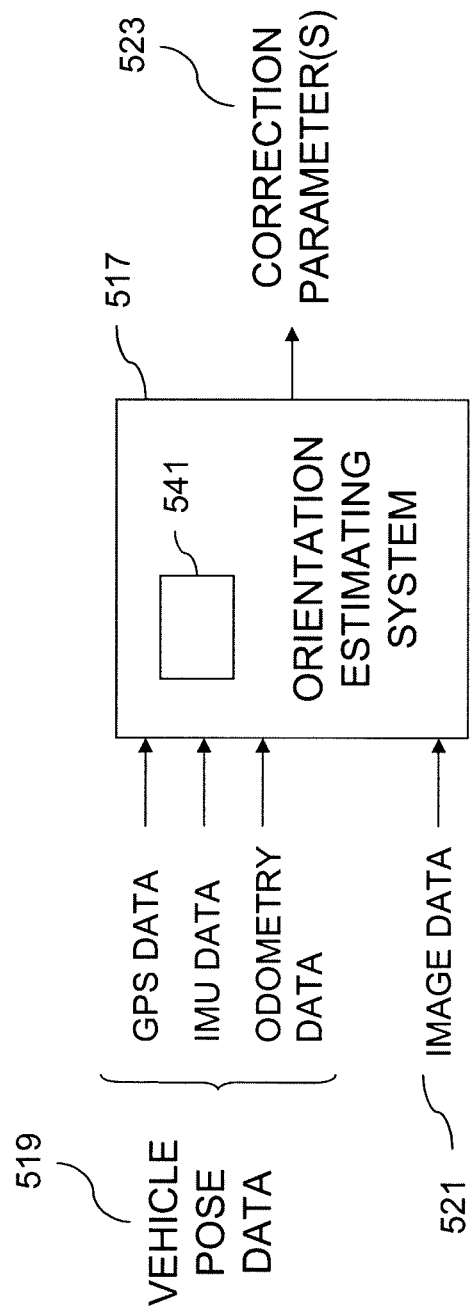
FIG. 5 is a block diagram depicting inputs and output of a system for estimating a camera orientation, according to an embodiment of the present invention.

An embodiment may include an orientation estimating system 517, as shown in FIG. 5. Orientation estimating system 517 may include a computing device 541. Computing device 541 can be any type of computing device having one or more processors. For example, computing device 541 can be a workstation, mobile device, computer, cluster of computers, set-top box, or other device having at least one processor. Such a computing device may include software, firmware, hardware, or a combination thereof. Software may include one or more applications and an operating system. Hardware can include, but is not limited to, a processor and a memory. Hardware may also include a graphical user interface display.

According to an embodiment, the orientation estimating system 517 may receive vehicle pose data 519, that may include GPS, IMU, and the vehicle's wheel odometry data, and image data 521, that may include image data obtained by a panoramic camera 104 mounted on the vehicle. In an embodiment, the orientation estimating system 517 may determine vehicle pose estimates based on vehicle pose data 519, or alternatively, vehicle pose estimates may be provided to orientation estimating system 517 as part of the vehicle pose data 519. In an embodiment, the orientation estimating system 517 may determine image track data based on image data 521, using feature matching for example, or alternatively, image track data may be provided to orientation estimating system 517 as part of the image data 521. The orientation estimating system 517 may then determine one or more correction parameters 523 that may be applied to image data 521, for example, to provide correctly oriented views, as discussed in the following paragraphs.

According to an embodiment, the determination of one or more correction parameters 523 may be accomplished by applying an orientation estimation algorithm to the vehicle pose estimates and image track data obtained via feature matching. The orientation estimation algorithm may be used to improve vehicle pose estimates, estimates of the three-dimensional locations of the entities used for the feature matching, and estimates of the camera orientation relative to the GPS/IMU sensors that were used to obtain the vehicle's pose estimates.

Figure 6:
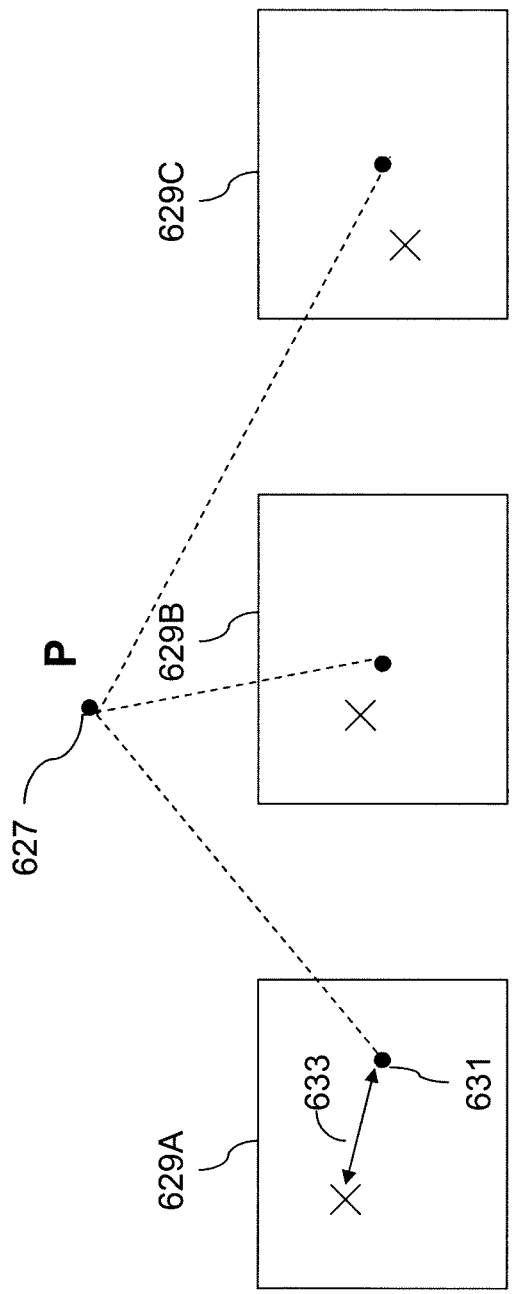
FIG. 6 is a diagram depicting an example of feature matching.

The feature matching in the captured images may be accomplished using known feature matching techniques. For various embodiments, a set of features (e.g., scale-invariant salient points on an image, where a lot of texture is present) are detected in images captured by a panoramic camera. The detected features from different camera images (e.g., captured at different times) are matched using their appearance to find corresponding sets of features. Each set of matching features is assumed to be produced by the same entity, which has a certain three-dimensional position in the world. Matched feature points may be grouped into one or more tracks, each track including a sequence of matched feature points stemming from a single three-dimensional location. An example of a portion of the feature matching process is shown in FIG. 6. In FIG. 6, a feature point 627 is detected in different images 629A, 629B, and 629C as detected feature point 631.

Figure 7:
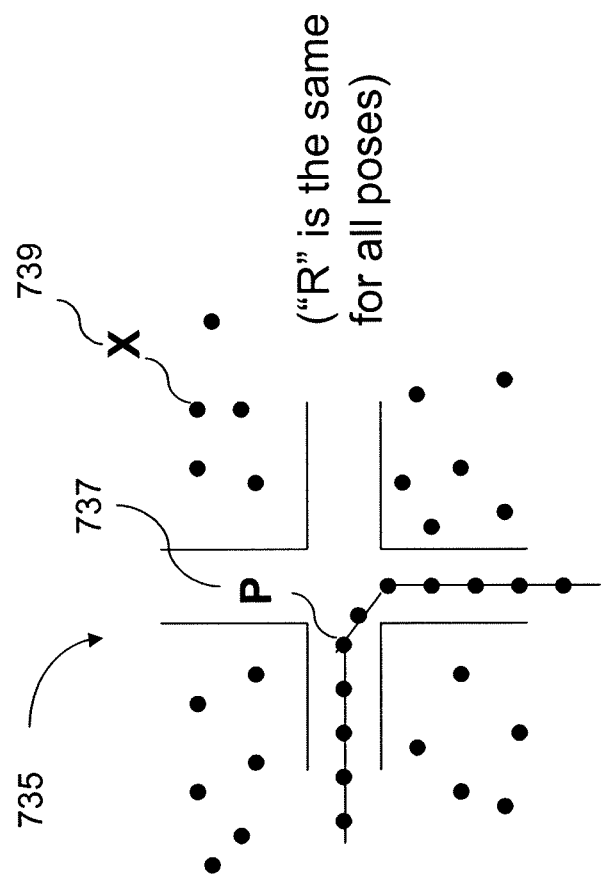
FIG. 7 is a diagram depicting an example of pose, rotation, and three-dimensional location.

In an embodiment, the key parameters involved with the orientation estimation algorithm are vehicle pose (P), three-dimensional locations of the entities used for feature matching (X), and camera orientation relative to the GPS/IMU sensors (R). These parameters are demonstrated in FIG. 7. For a vehicle (not shown) moving along roadways 735, the vehicle's pose (P) at different locations is represented by points 737. The three-dimensional locations (X) of entities "viewed" from the vehicle are represented by points 739. The orientation R of a camera (not shown) mounted on the vehicle relative to GPS/LMU sensors located in, on, or coupled to the vehicle is the same for all poses 737.

In an embodiment, the orientation estimation algorithm is based on Equation 800, shown in FIG. 8. Equation 800 is a nonlinear function defined by:

$$F(P,X,R) = \Sigma_t \Sigma_i \rho((T_{Pi,R}(X_t) - I_{Xt}))^2 + \lambda \Sigma_i (P_i - P_{ESTi})^2$$

where
P=$P_1, P_2, \ldots, P_N$ and represents a set of vehicle poses;
$P_i$ represents a pose of the vehicle at time i;
X=$X_1, X_2, \ldots, X_M$ and represents three-dimensional locations of track points in a scene;
$X_t$ represents a three-dimensional location of a track t in the scene;
R represents the rotation of the camera;
$\rho$ denotes a robustifier function (e.g., a Cauchy robustifier);
T represents projection;
$I_{Xt}$ represents a fixed location in a given image, where a feature corresponding to track point $X_t$ was detected;
$\lambda$ represents a weight used to trade off strength of a first and a second term in F; and
$P_{ESTi}$ represents an initial or a previous pose estimate of the vehicle.

In an embodiment, Equation 800 may be used to determine estimates of vehicle pose P, entity locations X, and camera orientation R. Multiple iterations of Equation 800 may provide improved estimates of P, X, and R. Estimated camera orientation R may be applied to image data of images captured by the camera 104 to correct their orientation so that they may be more accurately viewed. For example, the camera orientation R may be applied to the image data at a point when the image is stitched.

In Equation 800, $T_{Pi,R}(X_t) - I_{Xt}$ represents reprojection error and $P_i - P_{ESTi}$ represents pose error. Reprojection error is a geometric error that corresponds to the image distance between a projected point and a measured point. It is used to quantify how closely an estimate of a three-dimensional point recreates the point's true projection. In FIG. 6, reprojection error is shown in an exaggerated way, for clarity, as distance 633. According to an embodiment, using Equation 800, parameters P, X, and R are to be determined such that they minimize reprojection error. In other words, the projections of the three-dimensional entities into an image should overlap with the image features that were detected with feature matching. At the same time, the pose should remain as similar to the original pose as possible. Thus, Equation 800 allows one to determine the relative rotational alignment that best determines camera orientation and that minimizes reprojection error with the original set of pose estimates.

The minimization of the objective in Equation 800 can be performed with any standard non-linear optimization technique, such as but not constrained to Levenberg-Marquardt, Conjugate Gradient, or gradient descent methods.

Assuming an accurate set of initial vehicle pose estimates determined using GPS, INM, and wheel odometry data is used, the orientation estimation algorithm described above provides the rotation between the initial vehicle pose estimates (dependent on the GPS/IMU coordinate systems) and the poses that minimize reprojection error (dependent on the coordinate system of the camera).

In the embodiments described above, a camera rotation correction parameter is determined for a particular portion, or subsequence, of a run. The quality of the result, however, is dependent on the quality of the initial vehicle pose estimate that one may determine from wheel odometry data and the data from GPS and IMU sensors. If the initial vehicle pose estimate is inaccurate due to errors in the GPS, IMU, and/or wheel odometry inputs, the camera rotation correction parameter may also be inaccurate. The following section discusses ways to make the camera rotation correction parameter more robust in accordance with various embodiments.

Further Optimization of Orientation Correction

In the above-described embodiments, a camera rotation correction parameter is determined for a single subsequence of a given, or selected, run. According to one embodiment, the rotation correction parameter may be made more robust by analyzing multiple subsequences of a selected run. For example, in one embodiment, multiple rotation correction parameters may be determined, as described above, for a multitude of subsequences of a selected run, and statistical analysis, possibly with outlier removal, may be performed on the determined correction parameters to determine an optimized correction parameter. For example, in an embodiment, a median of the determined correction parameters may be determined and used as an optimized correction parameter.

Optionally, from a multitude of determined correction parameters, correction parameters that appear to be very different from the rest may be ignored or removed from the analysis. As an example, in one embodiment, correction parameters may be ignored for subsequences of the selected run in which the acceleration of the vehicle is above a predetermined value or outside of a given range. As a further example, in one embodiment, correction parameters may be ignored for subsequences of the selected run in which the vehicle is moving outside of a predetermined velocity range. In yet another example, in one embodiment, a cost function may be used, possibly within a dynamic programming algorithm that chooses subsequences of the selected run that abide with one or more given rules (e.g., having a vehicle acceleration that is within a given range, having a vehicle velocity that is within a given range, etc.).

Figure 9:
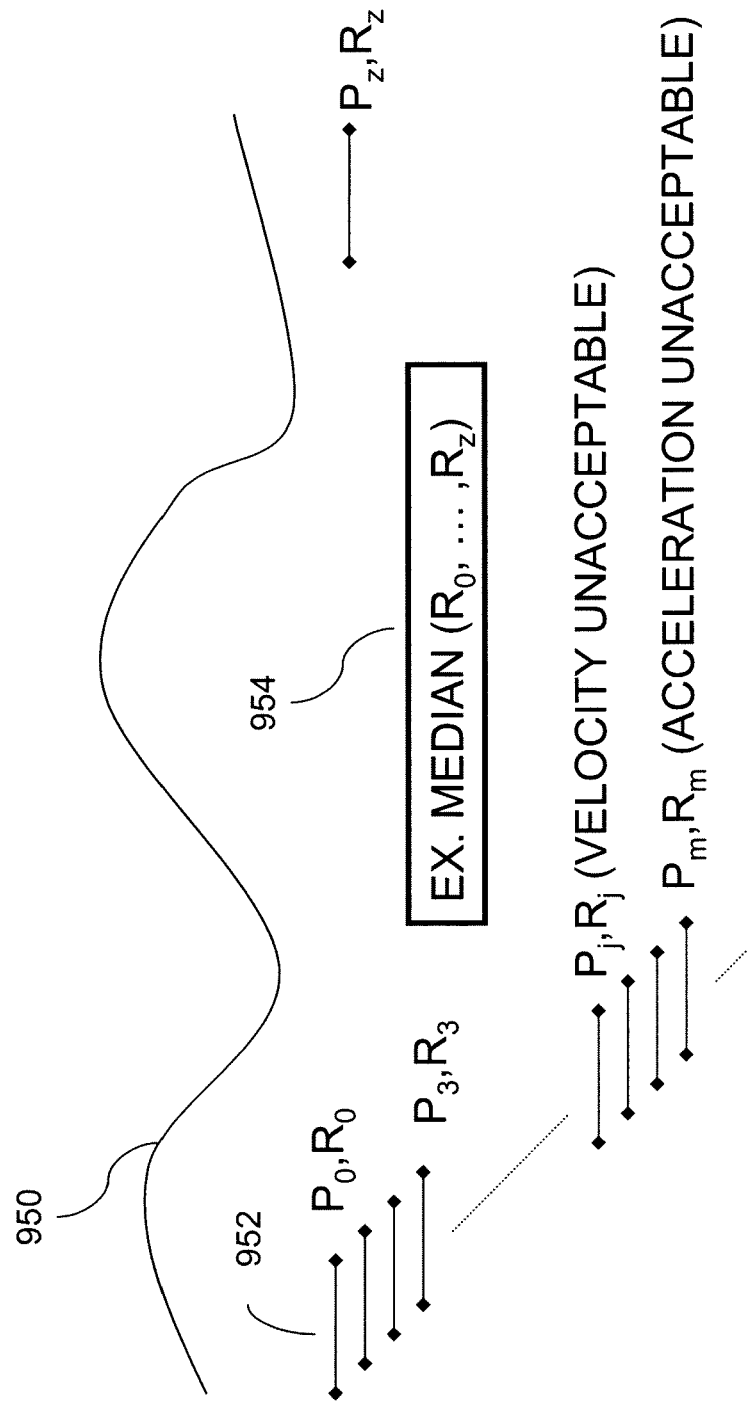
FIGS. 9 and 10 depict ways of improving the camera orientation correction parameter that may be determined from the equation shown in FIG. 8, according to embodiments of the present invention.

FIG. 9 demonstrates an example of improving the camera orientation correction parameter as described above, in accordance with various embodiments. In FIG. 9, a run 950, representing a run of a data collection vehicle for example, is shown as consisting of many distinct subsequences 952, each with their own estimated pose P and rotation correction parameter R. In the example shown, subsequences 952 have overlap. However, it is not necessary for subsequences 952 to overlap. Instead, subsequences 952 may be sequential, for example. In the example shown, a median 954 of the estimates of rotation correction parameter R is determined, which may be used as an optimized rotation correction parameter R. As discussed above, rotation correction parameter R may be made even more robust by omitting outliers in its calculation. For example, it may be desirable to omit estimates $R_j$ and $R_m$ from the determination of median 954 because they are associated with subsequences where the vehicle's velocity was unacceptable and where the vehicle's acceleration was unacceptable, respectively. The example shown in FIG. 9 is just one example. It will be appreciated by those skilled in the art that other similar ways of optimizing rotation correction parameter R may be realized within the scope of the present invention.

Figure 10:
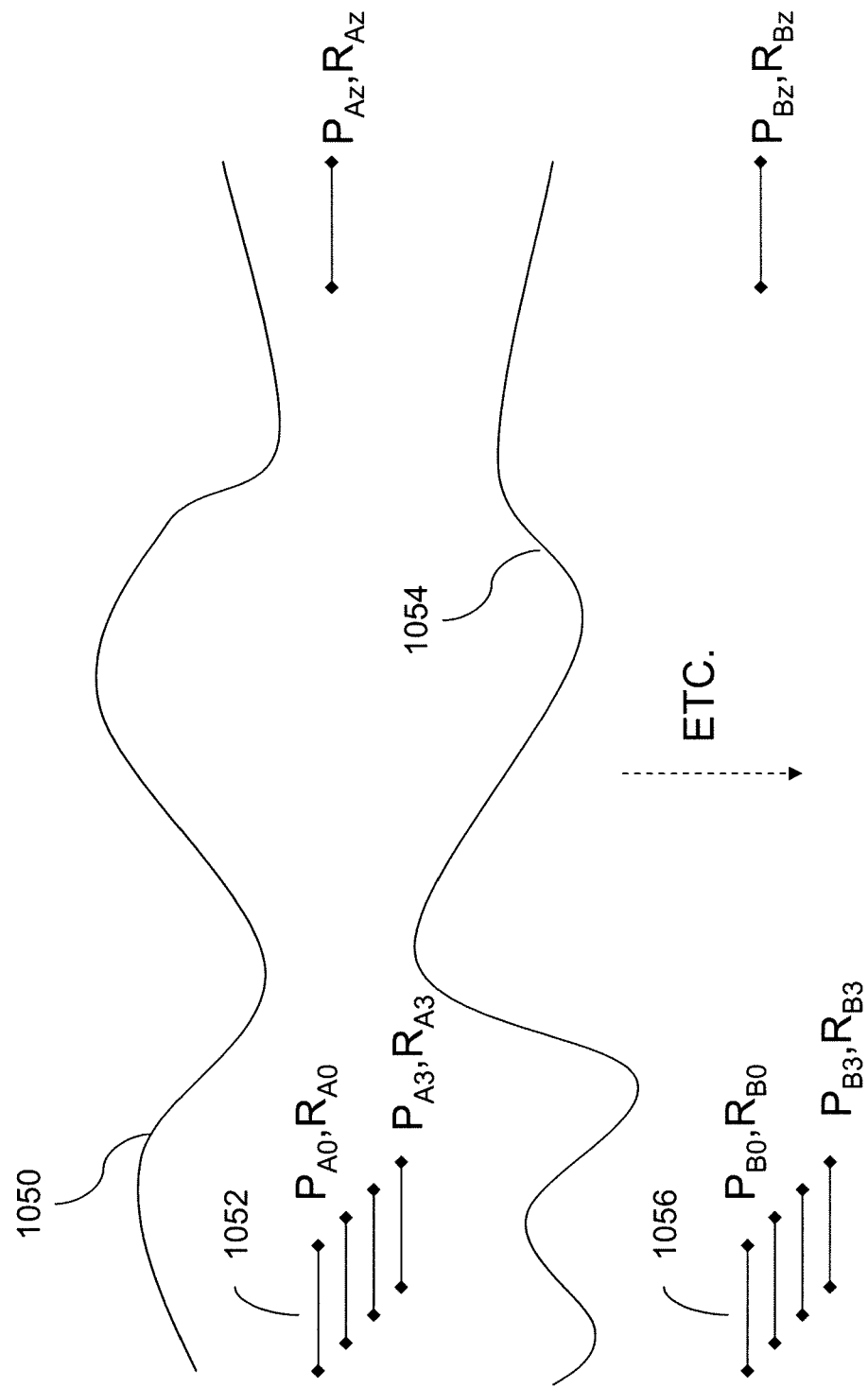

In an embodiment, the above optimization may be accomplished using information gathered over multiple runs. In one embodiment, for example, multiple rotation correction parameters may be determined, as described above, for a multitude of subsequences of multiple runs. Statistical analysis, possibly with outlier removal, may be performed on the determined correction parameters to determine an optimized correction parameter, as previously described above. FIG. 10 demonstrates an example showing multiple subsequences of multiple runs, in accordance with an embodiment. In FIG. 10, a run 1050 is shown consisting of many distinct subsequences 1052, and a run 1054 is shown consisting of many distinct subsequences 1056, each with their own estimated pose P and rotation correction parameter R (e.g., $P_{AO}$, $R_{AO}$–$P_{AZ}$, $R_{AZ}$ for run 1050, and $P_{BO}$, $R_{BO}$–$P_{BZ}$, $R_{BZ}$ for run 1054). Additional runs could also exist.

In an embodiment, an optimized rotation correction parameter R may be determined by, for each run of a multitude of runs, determining a first median of the determined rotation correction parameters for each of the closest Z runs backward in time, and determining a second median of the determined rotation correction parameters for each of the closest Z runs forward in time. Either the first or second median may be chosen as the optimized rotation correction parameter based on which of the first or second median is closest to the rotation correction parameter determined for that run.

The analysis and determination of optimized rotation correction parameters can be done by orientation estimating system 517, described previously.

System Architecture

Figure 11A:
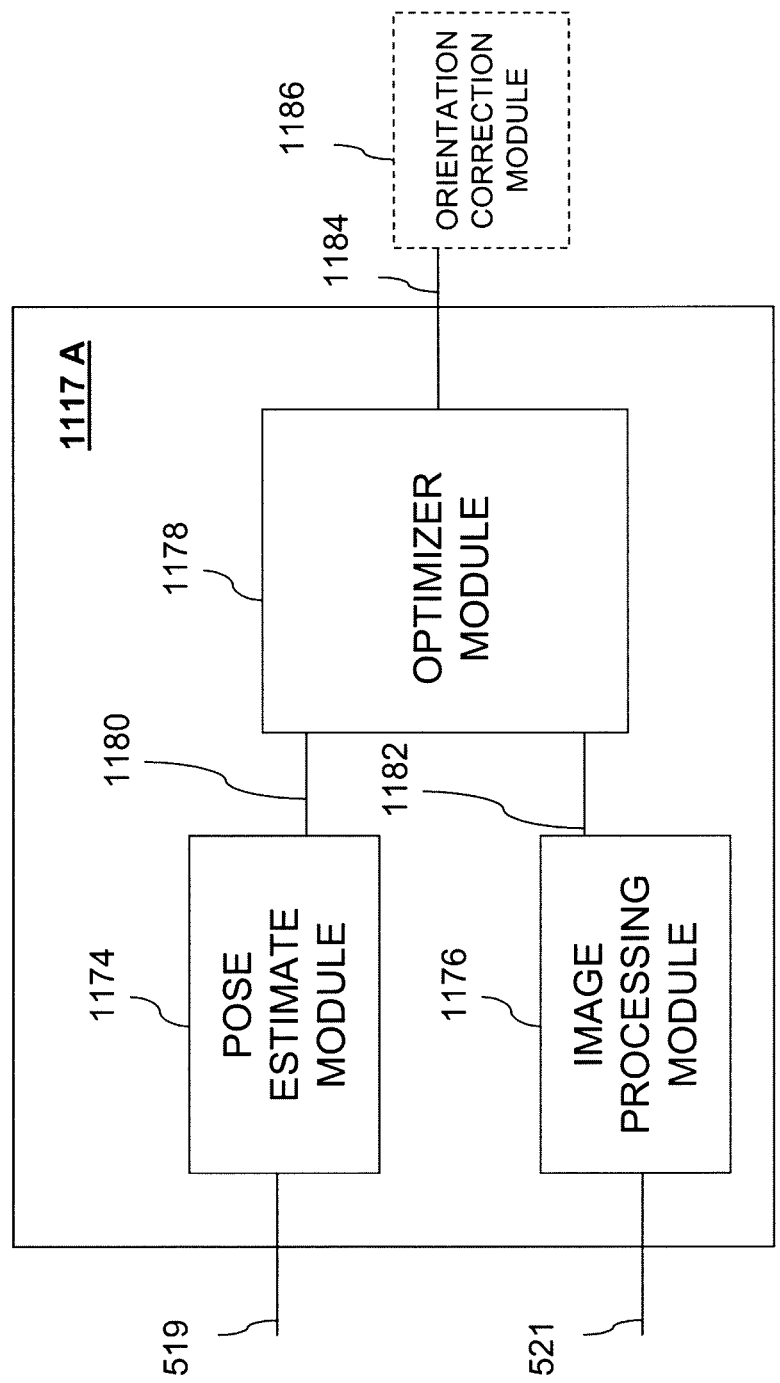
FIGS. 11A and 11B are block diagrams depicting systems for estimating a camera orientation, according to embodiments of the present invention.
Figure 11B:
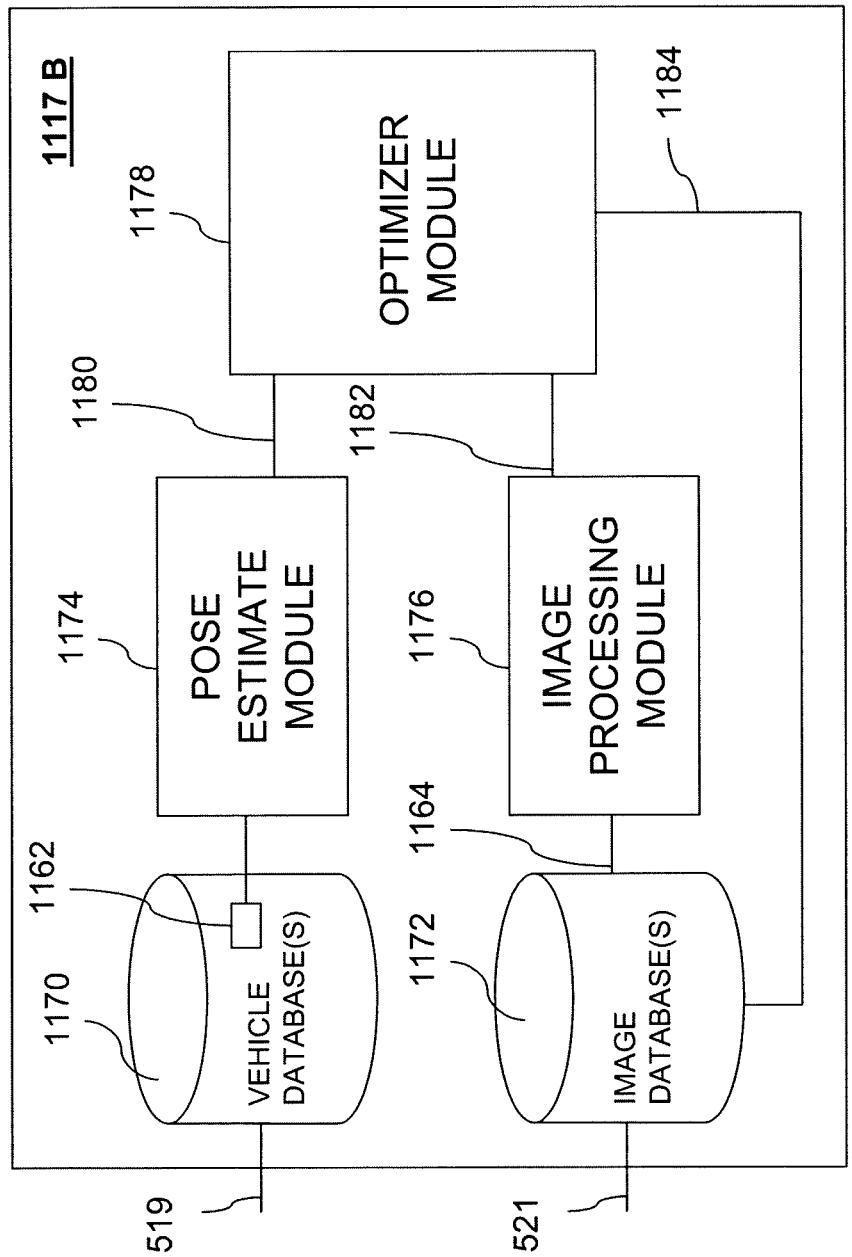
Figure 12:
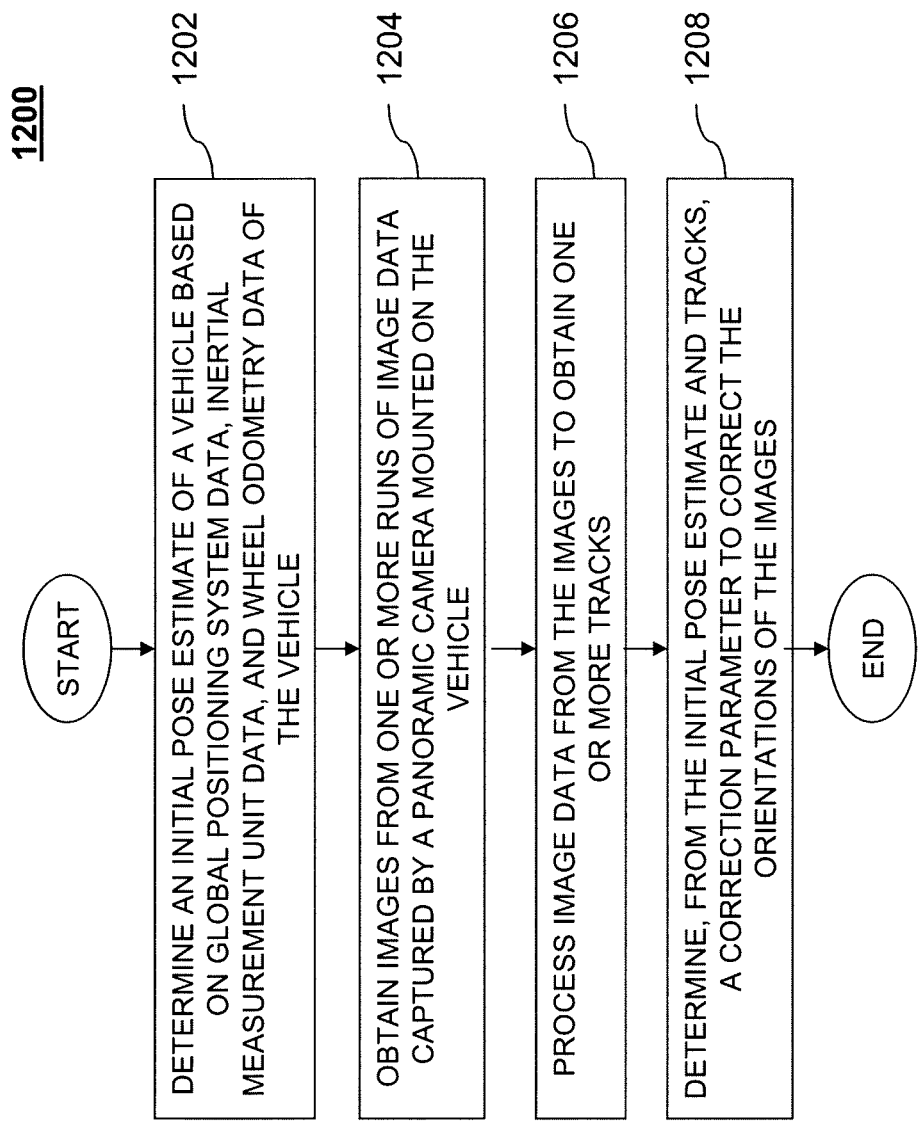
FIG. 12 is a flowchart depicting a method for estimating orientation of a camera mounted on a vehicle, according to an embodiment of the present invention.

FIGS. 11A and 11B are block diagrams depicting systems 1117A and 1117B, respectively, for estimating a camera orientation, according to embodiments. Systems 1117A and 1117B may each be substituted as system 517 shown in FIG. 5.

Systems 1117A and 1117B may include a pose estimate module 1174, an image processing module 1176, and an optimizer module 1178. In an embodiment, each of the pose estimate module 1174, image processing module 1176, and optimizer module 1178 may include one or more processors of one or more computing devices, such as computing device 541 shown in FIG. 5 and discussed above. In one embodiment, pose estimate module 1174, image processing module 1176, and optimizer module 1178 may each be implemented as one or more processors of a single computing device. Pose estimate module 1174, image processing module 1176, and optimizer module 1178 may be implemented using software, firmware, hardware, or a combination thereof.

With reference to FIG. 11A, according to an embodiment, pose estimate module 1174 may receive or obtain vehicle-related data 519 for a particular vehicle, such as wheel odometry data, GPS-related data, and IMU-related data. Pose estimate module 1174 may use vehicle-related data 519 to determine pose estimates 1180 for the vehicle.

According to an embodiment, image processing module 1176 may receive or obtain images and related image data 521 obtained from a panoramic camera 104 mounted on the vehicle. Image processing module 1176 may conduct feature matching based on images and related image data 521 to determine image track data 1182 related to the three-dimensional locations of the entities used for feature matching.

According to an embodiment, optimizer module 1178 may determine, for example using Equation 800 defined above, estimates of vehicle pose (P), three-dimensional location of the entities used for feature matching (X), and a rotation correction parameter (R) based on pose estimates 1180 and image track data 1182. The P, X, and R estimates 1184 may be output for use by another system (not shown) or stored in a data store or database (not shown).

System 1117B is similar to system 1117A, except that system 1117B includes one or more databases for the vehicle data and one or more databases for the image information as part of the camera orientation estimating system. In an embodiment, vehicle database 1170 may include vehicle-related data 1162 for a particular vehicle, such as wheel odometry data, GPS-related data, and IMU-related data. Pose estimate module 1174 may use vehicle-related data 1162 to determine pose estimates 1180 for the vehicle.

In an embodiment, image database 1172 may include images and related image data 1164 obtained from a camera 104 mounted on the vehicle. Image processing module 1176 may conduct feature matching based on images and related image data 1164 that it receives from image database 1172 to determine image track data 1182 related to the three-dimensional locations of the entities used for feature matching.

As previously described, optimizer module 1178 of system 1117B may determine, for example using Equation 800 defined above, estimates of vehicle pose (P), three-dimensional location of the entities used for feature matching (X), and a rotation correction parameter (R) based on pose estimates 1180 and image track data 1182. In an embodiment, the P, X, and R estimates 1184 may be stored in a data store, such as image database 1172, for example, or another storage location (not shown). In another embodiment, the P, X, and R estimates 1184 may be output as shown in FIG. 1117A.

Rotation correction parameter R may be applied to the images stored in image database 1172 for accurate viewing. In an embodiment, the application of rotation correction parameter R to a particular image may be done, for example, via a computer system, or processing module (such as an orientation correction module 1186 shown in FIG. 11A) during stitching of the image. In an embodiment, orientation correction module 1186 may be a part of system 1117A or 1117B. In another embodiment, orientation correction module 1186 may be in communication with, but separate from, system 1117A or 1117B. In one embodiment, orientation correction module 1186 can obtain correction parameter information from optimizer module 1178. In another embodiment, orientation correction module 1186 can obtain correction parameter information that is stored in image database 1172 (shown in FIG. 11B).

Methods

FIGS. 12-17 are flowcharts depicting methods for estimating and optimizing orientation of a camera 104 mounted on a vehicle, according to embodiments of the present invention. According to an embodiment, in step 1202 of method 1200 (FIG. 12), an initial pose estimate of a vehicle is determined based on global positioning system data, inertial measurement unit data, and wheel odometry data of the vehicle. In step 1204, images are obtained from one or more runs of image data captured by the camera 104. In step 1206, image data from the images is processed to obtain one or more tracks. Each track includes a sequence of matched feature points stemming from a single three-dimensional location. In step 1208, a correction parameter is determined from the initial pose estimate and tracks. Method 1200 then ends. In this way, a correction parameter for correcting skew of one or more images obtained by camera 104 is automatically determined. One or more of the steps of method 1200 may be performed by camera orientation estimating system 517 (or 1117A/B).

Figure 13:
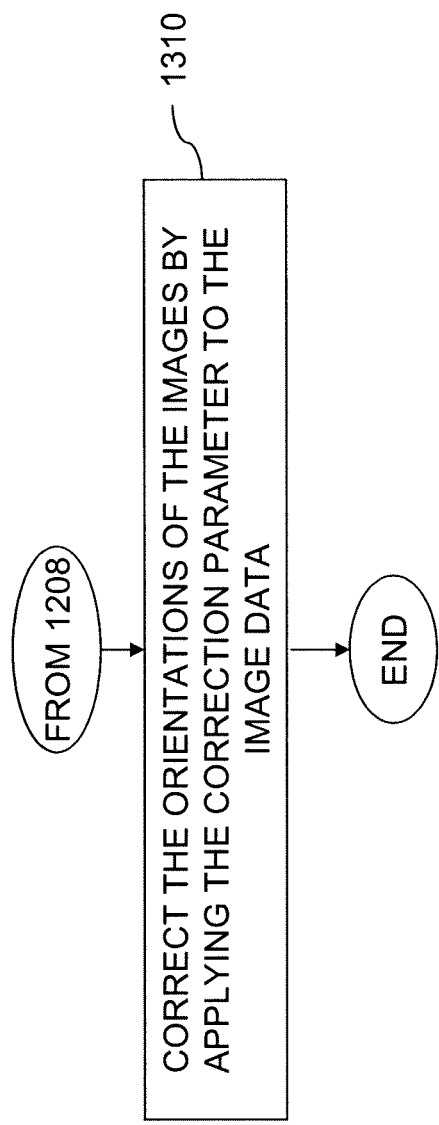
FIG. 13 is a flowchart depicting an optional further step of the method shown in FIG. 12, according to an embodiment of the present invention.

FIG. 13 is a flowchart depicting an optional further step of method 1200, according to an embodiment. In step 1310, which may stem from step 1208, orientations of the images are corrected by applying the correction parameter to the image data. In this way, a view of the image will appear correctly oriented even if the original image was skewed. In an embodiment, step 1310 may be performed by camera orientation estimating system 517 (or 1117A/B) or another processor or computing system, for example.

Figure 14:
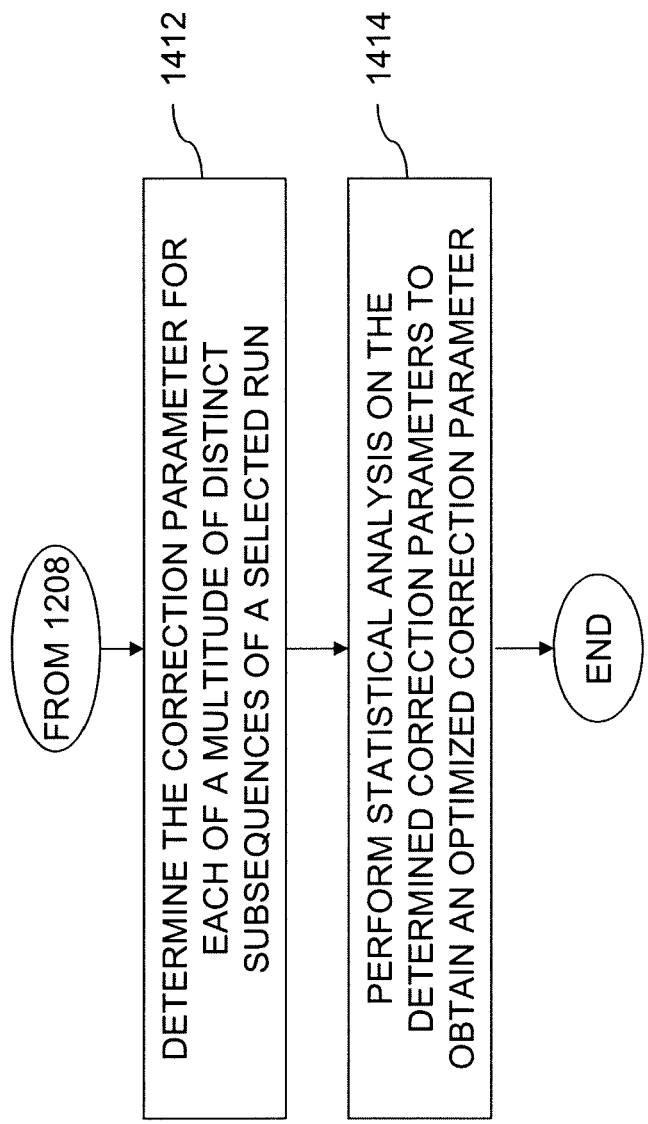
FIG. 14 is a flowchart depicting optional further steps of the method shown in FIG. 12, according to an embodiment of the present invention.

FIG. 14 is a flowchart depicting optional further steps of method 1200, according to an embodiment. In step 1412, which may stem from step 1208, the correction parameter for each of a multitude of distinct subsequences of a selected run is determined. In an embodiment, the subsequences may overlap. In another embodiment, the subsequences may be serial. In step 1414, statistical analysis, and possibly outlier removal, is performed on the determined correction parameters to obtain an optimized correction parameter, as discussed above with reference to FIG. 9.

Figure 15:
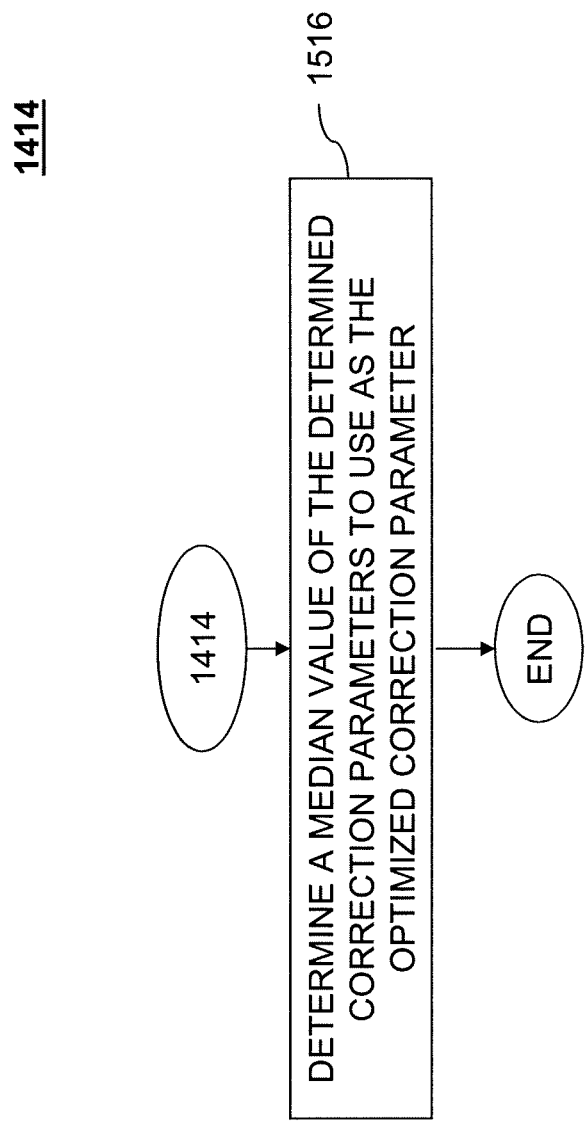
FIG. 15 is a flowchart depicting an example of step 1414 of the method shown in FIG. 14, according to an embodiment of the present invention.

In an embodiment, an example of step 1414 is shown in step 1516 of the flowchart in FIG. 15. In step 1516, a median value of the determined correction parameters is determined. This median value may be used as the optimized correction parameter. When applied to the image data, the optimized correction parameter will provide improved image orientation correction over a correction parameter that does not take smaller subsequences of a run into account.

Figure 16:
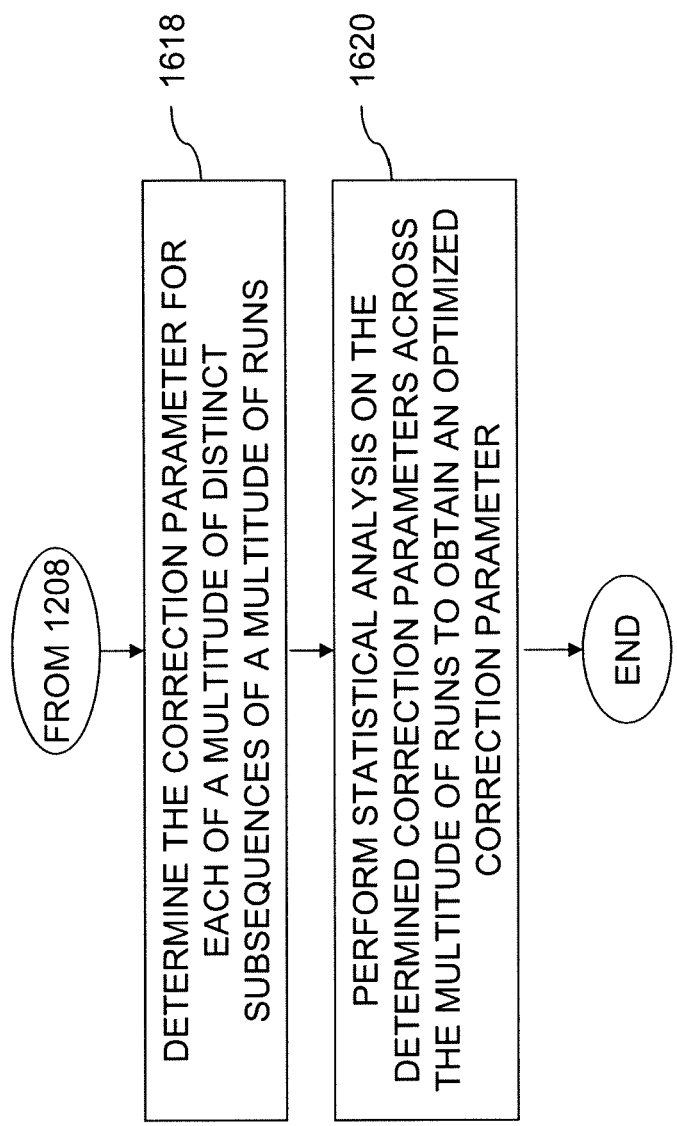
FIG. 16 is a flowchart depicting optional further steps of the method shown in FIG. 12, according to an embodiment of the present invention.

FIG. 16 is a flowchart depicting optional further steps of method 1200, according to an embodiment. In step 1618, which may stem from step 1208, the correction parameter for each of a multitude of distinct subsequences of a multitude of runs is determined. In step 1620, statistical analysis, and possibly outlier removal, is performed on the determined correction parameters across the multitude of runs to obtain an optimized correction parameter, as discussed above with reference to FIG. 10.

Figure 17:
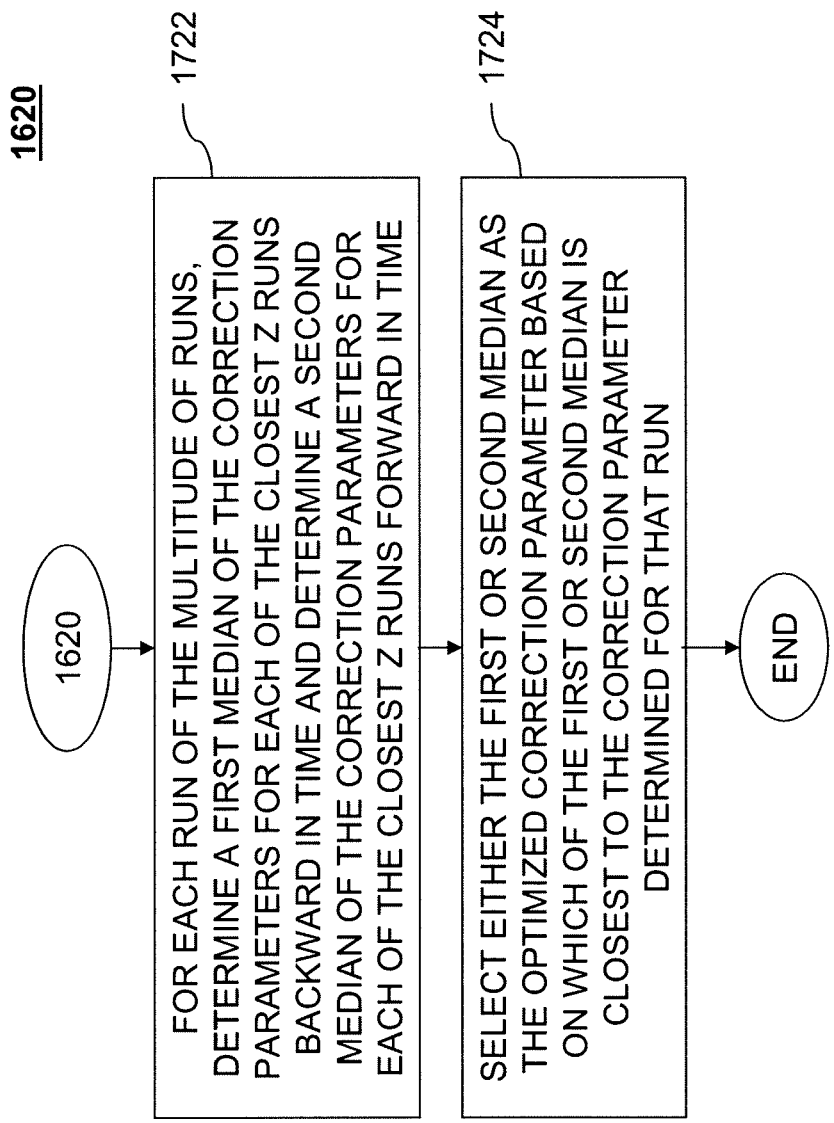
FIG. 17 is a flowchart depicting an example of step 1620 of the method shown in FIG. 16, according to an embodiment of the present invention.

In an embodiment, an example of step 1620 is shown in the flowchart in FIG. 17. In step 1722, for each run of the multitude of runs, a first median of the correction parameters is determined for each of the closest Z runs backward in time and a second median of the correction parameters is determined for each of the closest Z runs forward in time. In step 1724, either the first or second median may be chosen as the optimized correction parameter for a selected run based on which of the first or second median is closest to the correction parameter determined for that run. For example, if there were 100 runs, for a selected run, a first median may be determined for each of the closest 10 runs backward in time and a second median may be determined for each of the closest 10 runs forward in time. The median value that is closest to the determined correction parameter for that run may be chosen as the optimized correction parameter.

Exemplary Computer System

Figure 18:
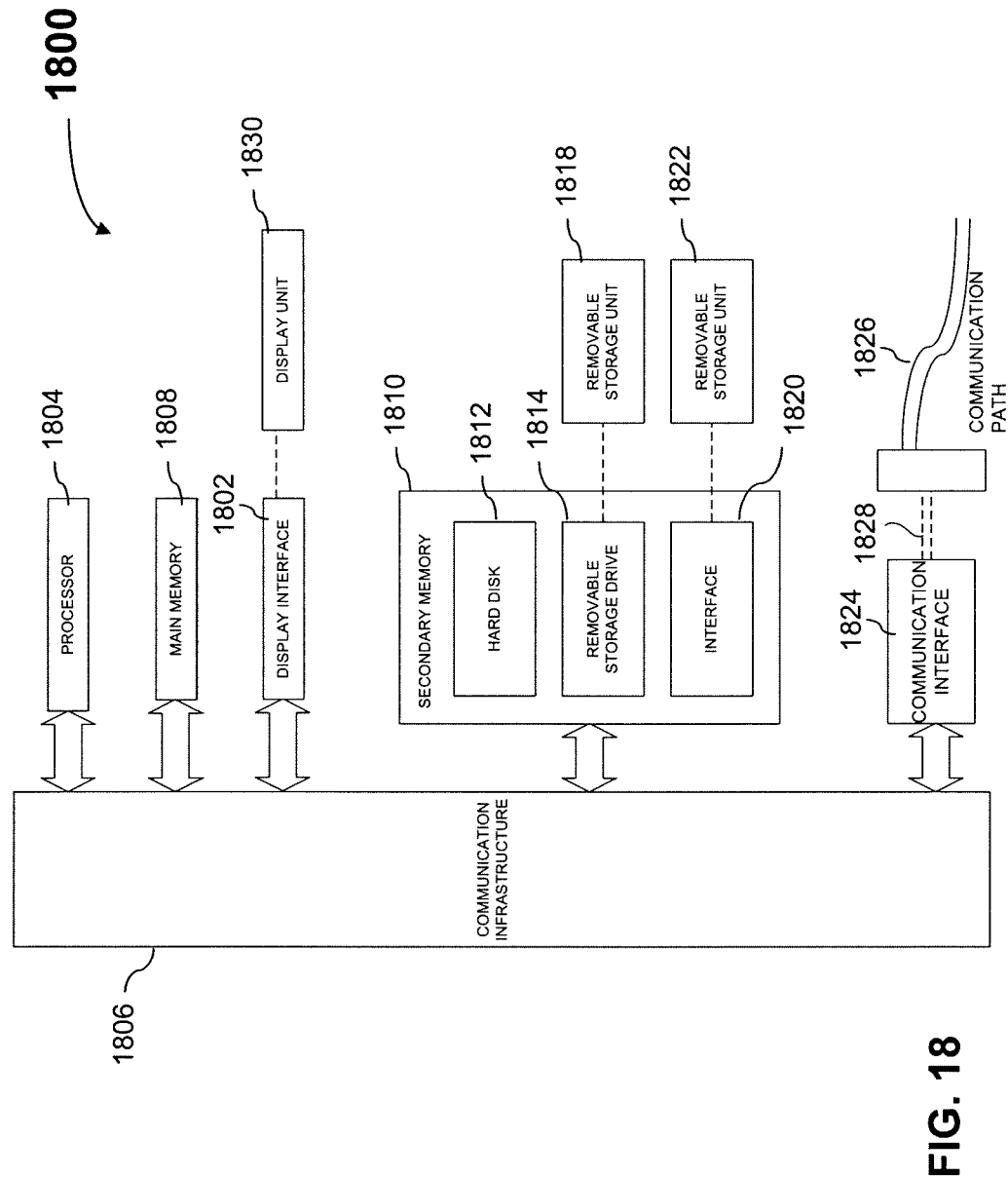
FIG. 18 is an exemplary block diagram of a computer system that can be used to implement embodiments of the present invention.

The various embodiments described herein may be implemented using hardware, software or a combination thereof and may be implemented in a computer system or other processing system. In an embodiment, the invention is directed toward a computer program product executing on a computer system capable of carrying out the functionality described herein. An example of a computer system 1800 is shown in FIG. 18. The orientation estimating systems 517 (of FIG. 5) and 1117A/B (of FIGS. 11A and 11B) described above could be implemented in a computer system including, but not limited to, computer system 1800. The computer system 1800 includes one or more processors, such as processor 1804. Processor 1804 may be a general purpose processor (such as, a CPU) or a special purpose processor (such as, a GPU). Processor 1804 is connected to a communication infrastructure 1806 (e.g., a communications bus, cross-over bar, or network). Various software embodiments are described in terms of this example computer system. After reading this description, it will become apparent to a person skilled in the relevant art how to implement the invention using other computer systems and/or computer architectures.

Computer system 1800 (optionally) includes a display interface 1802 (which can include input/output devices such as keyboards, mice, etc.) that forwards graphics, text, and other data from communication infrastructure 1806 (or from a frame buffer not shown) for display on display unit 1830.

Computer system 1800 also includes a main memory 1808, preferably random access memory (RAM), and may also include a secondary memory 1810. The secondary memory 1810 may include, for example, a hard disk drive 1812 and/or a removable storage drive 1814, representing a floppy disk drive, a magnetic tape drive, an optical disk drive, etc. The removable storage drive 1814 reads from and/or writes to a removable storage unit 1818 in a well-known manner. Removable storage unit 1818, represents a floppy disk, magnetic tape, optical disk, memory card, etc. which is read by and written to by removable storage drive 1814. As will be appreciated, the removable storage unit 1818 includes a computer readable storage medium having stored therein computer software and/or data.

In alternative embodiments, secondary memory 1810 may include other similar means for allowing computer programs or other instructions to be loaded into computer system 1800. Such means may include, for example, a removable storage unit 1822 and an interface 1820. Examples of such may include a program cartridge and cartridge interface (such as that found in video game devices), a removable memory chip (such as an EPROM, or PROM) and associated socket, and other removable storage units 1822 and interfaces 1820 which allow software and data to be transferred from the removable storage unit 1822 to computer system 1800.

Computer system 1800 may also include a communication interface 1824. Communication interface 1824 enables computer 1800 to communicate with external and/or remote devices. For example, communication interface 1824 allows software and data to be transferred between computer system 1800 and external devices. Communication interface 1824 also allows computer 1800 to communicate over communication networks, such as LANs, WANs, the Internet, etc. Communication interface 1824 may interface with remote sites or networks via wired or wireless connections.

Examples of communications interface 1824 may include a modem, a network interface (such as an Ethernet card), a communications port, a PCMCIA slot and card, etc. Computer 1800 receives data and/or computer program products via communication network 1824. Software and data transferred via communications interface 1824 are in the form of signals 1828 which may be electronic, electromagnetic, optical or other signals capable of being received by communications interface 1824. These signals 1828 are provided to communications interface 1824 via a communications path (i.e., channel) 1826. This channel 1826 carries signals 1828 and may be implemented using wire or cable, fiber optics, a phone line, a cellular phone link, an RF link and other wired or wireless communications channels.

In this document, the terms "computer program medium" and "computer usable medium" and "computer readable medium" are used to generally refer to media such as removable storage drive 1814, and a hard disk installed in hard disk drive 1812. These computer program products are means for providing software to computer system 1800.

Computer programs (also called computer control logic) are stored in main memory 1808 and/or secondary memory 1810. Computer programs may also be received via communications interface 1824. Such computer programs, when executed, enable the computer system 1800 to perform the features of the present invention as discussed herein. In particular, the computer programs, when executed, enable the processor 1804 to perform the features of the present invention. Accordingly, such computer programs represent controllers of the computer system 1800.

In an embodiment implemented using software, the software may be stored in a computer program product and loaded into computer system 1800 using removable storage drive 1814, hard disk drive 1812 or communications interface 1824. The control logic (software), when executed by the processor 1804, causes the processor 1804 to perform the functions of the invention as described herein.

The invention can work with software, hardware, and operating system implementations other than those described herein. Any software, hardware, and operating system implementations suitable for performing the functions described herein can be used.

CONCLUSION

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation and without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The Summary and Abstract sections may set forth one or more but not all exemplary embodiments of the present invention as contemplated by the inventor(s), and thus, are not intended to limit the present invention and the appended claims in any way.

Further, the purpose of the foregoing Abstract is to enable the U.S. Patent and Trademark Office, the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method for estimating orientation of a camera mounted on a vehicle, comprising:
   determining, by at least one processor, an initial pose estimate of a vehicle having a camera mounted thereon, the initial pose estimate based on global positioning system data, inertial measurement unit data, and wheel odometry data of the vehicle, wherein a pose of the vehicle is defined as a position and orientation of the vehicle relative to the world;
   obtaining images from one or more runs of image data captured by the camera, the images each having an orientation;
   processing image data from the images to obtain one or more tracks, wherein each track includes a sequence of matched feature points stemming from a single three-dimensional location; and
   determining from the initial pose estimate and tracks, a correction parameter to correct the orientations of the images captured by the camera,
   wherein the processing image data comprises:
      extracting a set of feature points from the images of a given run of the one or more runs;
      matching one or more of the feature points in successive images of the given run; and
      grouping matched feature points into tracks,
   wherein the determining the correction parameter includes using a nonlinear function defined by:

$$F(P,X,R) = \Sigma_t \Sigma_i \rho((T_{P_i,R}(X_t) - I_{Xt})^2 + \lambda \Sigma_i (P_i - P_{ESTi})^2$$

wherein
   $P = P_1, P_2, \ldots, P_N$ and represents a set of vehicle poses;
   $P_i$ represents a pose of the vehicle at time i;
   $X = X_1, X_2, \ldots, X_M$ and represents three-dimensional locations of track points in a scene;
   $X_t$ represents a three-dimensional location of a track t in the scene;
   R represents the rotation of the camera;
   $\rho$ denotes a robustifier function (e.g., a Cauchy robustifier);
   T represents projection;
   $I_{Xt}$ represents a fixed location in a given image, where a feature corresponding to track point $X_t$ was detected;
   $\lambda$ represents a weight used to trade off strength of a first and a second term in F; and
   $P_{ESTi}$ represents an initial or a previous pose estimate of the vehicle, wherein the nonlinear function is used to optimize parameters P, X, and R, and wherein $T_{P_i,R}(X_t) - I_{Xt}$ represents reprojection error, and $P_j - P_{ESTi}$ represents pose error.

2. The method of claim 1, further comprising:
obtaining the global positioning system data, the inertial measurement unit data, and the wheel odometry data from a vehicle data store.

3. The method of claim 1, further comprising:
obtaining the image data from an image data store.

4. The method of claim 1, further comprising:
correcting the orientations of the images by applying the correction parameter to the image data.

5. The method of claim 1, wherein the processing image data comprises:
extracting a set of feature points from the images of a given run of the one or more runs;
matching one or more of the feature points in successive images of the given run; and
grouping matched feature points into tracks.

6. The method of claim 5, wherein the determining the correction parameter comprises determining:
an optimized pose of the vehicle;
a location of points of the tracks in three dimensions; and
a camera to vehicle pose rotation.

7. The method of claim 1, wherein R represents parameters for roll, pitch, and yaw.

8. The method of claim 1, further comprising:
determining the correction parameter for each of a multitude of distinct subsequences of a selected run of the one or more runs; and
performing statistical analysis on the determined correction parameters for different subsequences to determine an optimized correction parameter.

9. The method of claim 8, wherein the performing statistical analysis comprises:
determining a median value of the determined correction parameters to use as the optimized correction parameter.

10. The method of claim 9, wherein the determining the median value omits determined correction parameters for subsequences of the selected run in which the acceleration of the vehicle is above a predetermined value.

11. The method of claim 9, wherein the determining the median value omits determined correction parameters for subsequences of the selected run in which the acceleration of the vehicle is within a given range.

12. The method of claim 9, wherein the determining the median value omits determined correction parameters for subsequences of the selected run in which the vehicle is moving outside of a predetermined velocity range.

13. The method of claim 8, wherein the determining the correction parameter includes performing a cost function within a dynamic programming algorithm that chooses subsequences of the selected run that abide with one or more of:
having a vehicle acceleration that is within a given range; and
having a vehicle velocity that is within a given range.

14. The method of claim 1, further comprising:
determining the correction parameter for each of a multitude of distinct subsequences of a multitude of runs of the one or more runs; and
performing statistical analysis on the determined correction parameters across the multitude of runs to determine an optimized correction parameter.

15. The method of claim 14, wherein the performing statistical analysis includes:
for each run of the multitude of runs, determining a first median of the correction parameters for each of the closest Z runs backward in time and determining a second median of the correction parameters for each of the closest Z runs forward in time; and
choosing either the first or second median as the optimized correction parameter based on which of the first or second median is closest to the correction parameter determined for that run,
wherein Z is a predetermined number.

16. A computer program product comprising a computer readable storage device having control logic stored therein for causing a computer to estimate orientation of a camera mounted on a vehicle, the control logic comprising:
a first computer readable program code that enables the computer to determine an initial pose estimate of a vehicle having a camera mounted thereon, the initial pose estimate based on global positioning system data, inertial measurement unit data, and wheel odometry data of the vehicle, wherein a pose of the vehicle is defined as a position and orientation of the vehicle relative to the world;
a second computer readable program code that enables the computer to obtain images from one or more runs of image data captured by the camera, the images each having an orientation;
a third computer readable program code that enables the computer to process image data from the images to obtain one or more tracks, wherein each track includes a sequence of matched feature points stemming from a single three-dimensional location; and
a fourth computer readable program code that enables the computer to determine, from the initial pose estimate and tracks, a correction parameter to correct the orientations of the images captured by the camera,
wherein the third computer readable program code that enable the computer to process image data to:
extract a set of feature points from the images of a given run of the one or more runs;
match one more of the feature points in successive images of the given run; and
group matched feature points into tracks,
wherein the fourth computer readable program code that enables the computer to determine the correction parameter using a nonlinear function defined by:

$$F(P,X,R) = \Sigma_t \Sigma_i \rho((T_{P_i,R}(X_t) - I_{Xt}))^2 + \lambda \Sigma_i (P_i - P_{ESTi})^2$$

wherein
$P = P_1, P_2, \ldots, P_N$ and represents a set of vehicle poses;
$P_i$ represents a pose of the vehicle at time i;
$X = X_1, X_2, \ldots, X_M$ and represents three-dimensional locations of track points in a scene;
$X_t$ represents a three-dimensional location of a track t in the scene;
R represents the rotation of the camera;
$\rho$ denotes a robustifier function (e.g., a Cauchy robustifier);
T represents projection;
$I_{Xt}$ represents a fixed location in a given image, where a feature corresponding to track point $X_t$ was detected;
$\lambda$ represents a weight used to trade off strength of a first and a second term in F; and
$P_{ESTi}$ represents an initial or a previous pose estimate of the vehicle, and
wherein the nonlinear function is used to optimize parameters P, X, and R and wherein $T_{P_i,R}(X_t) - I_{Xt}$ represents reprojection error, and $P_j - P_{ESTi}$ represents pose error.

17. The computer program product of claim 16, further comprising:
a fifth computer readable program code that enables the computer to correct the orientations of the images by applying the correction parameter to the image data.

18. The computer program product of claim 16, wherein the third computer readable program code enables the computer to
- extract a set of feature points from the images of a given run of the one or more runs;
- match one or more of the feature points in successive images of the given run; and
- group matched feature points into tracks.

19. The computer program product of claim 18, wherein the fourth computer readable program code enables the computer to determine:
- an optimized pose of the vehicle;
- a location of points of the trucks in three dimensions; and
- a camera to vehicle pose rotation.

20. The computer program product of claim 16, wherein the control logic further comprises:
- a fifth computer readable program code that enables the computer to
  - determine the correction parameter for each of a multitude of distinct subsequences of a selected run of the one or more runs; and
  - perform statistical analysis on the determined correction parameters for different subsequences to determine an optimized correction parameter.

21. The computer program product of claim 16, wherein the control logic further comprises:
- a fifth computer readable program code that enables the computer to
  - determine the correction parameter for each of a multitude of distinct subsequences of a multitude of runs of the one or more runs; and
  - perform statistical analysis on the determined correction parameters across the multitude of runs to determine an optimized correction parameter.

22. A system for estimating orientation of a camera mounted on a vehicle, comprising:
- a computing device;
- a pose estimator, implemented on the computing device, that determines an initial pose estimate of the vehicle based on global positioning system data, inertial measurement unit data, and wheel odometry data of the vehicle, wherein a pose of the vehicle is defined as a position and orientation of the vehicle relative to the world;
- an image processor, implemented on the computing device, that processes image data from one or more runs of image data captured by a camera mounted on the vehicle, the images each having an orientation, to obtain one or more tracks, wherein each track includes a sequence of matched feature points stemming from a single three-dimensional location; and
- an optimizer, implemented on the computing device, in communication with the pose estimate module and the image processing module, that determines, from the initial pose estimate and tracks, a correction parameter to correct the orientations of the images,
- wherein the image processor processes the image data to:
  - extract a set of feature points from the images of a given run of the one or more runs;
  - match one or more of the feature points in successive images of the given run; and
  - group matched feature points into tracks,
- wherein the optimizer determines the correction parameter using a nonlinear function defined by:

$$F(P,X,R) = \Sigma_t \Sigma_i \rho((T_{P_i,R}(X_t) - I_{Xt}))^2 + \lambda \Sigma_i (P_i - P_{ESTi})^2$$

wherein
- $P = P_1, P_2, \ldots, P_N$ and represents a set of vehicle poses;
- $P_i$ represents a pose of the vehicle at time i;
- $X = X_1, X_2, \ldots, X_M$ and represents three-dimensional locations of track points in a scene;
- $X_t$ represents a three-dimensional location of a track t in the scene;
- R represents the rotation of the camera;
- $\rho$ denotes a robustifier function (e.g., a Cauchy robustifier);
- T represents projection;
- $I_{Xt}$ represents a fixed location in a given image, where a feature corresponding to track point $X_t$ was detected;
- $\lambda$ represents a weight used to trade off strength of a first and a second term in F; and
- $P_{ESTi}$ represents an initial or a previous pose estimate of the vehicle, and wherein the nonlinear function is used to optimize parameters P, X, and R and wherein $T_{P_i,R}(X_t) - I_{Xt}$ represents reprojection error, and $P_j - P_{ESTi}$ represents pose error.

23. The system of claim 22, further comprising:
- an orientation correction module that corrects the orientations of the images by applying the correction parameter to the image data.

24. A system for estimating orientation of a camera mounted on a vehicle, comprising:
- one or more vehicle databases, implemented on the computing device, containing global positioning system data, inertial measurement unit data, and wheel odometry data of a vehicle;
- an image database of images, implemented on the computing device, and corresponding image data from one or more runs of image data captured by a camera mounted on the vehicle, the images each having an orientation;
- a pose estimate module, implemented on the computing device, in communication with the one or more vehicle databases, that determines an initial pose estimate of the vehicle based on the global positioning system data, the inertial measurement unit data, and the wheel odometry data of the vehicle, wherein a pose of the vehicle is defined as a position and orientation of the vehicle relative to the world;
- an image processing module, implemented on the computing device, in communication with the image database, that processes the image data to obtain one or more tracks, wherein each track includes a sequence of matched feature points stemming from a single three-dimensional location; and
- an optimizer module, implemented on the computing device, in communication with the pose estimate module and the image processing module, that determines, from the initial pose estimate and tracks, a correction parameter to correct the orientations of the images,
- wherein the image processing module processes the image data to:
  - extract a set of feature points from the images of a given run of the one or more runs;
  - match one or more of the feature points in successive images of the given run; and
  - group matched feature points into tracks,
- wherein the optimizer module when determining the correction parameter uses a nonlinear function defined by:

$$F(P,X,R) = \Sigma_t \Sigma_i \rho((T_{P_i,R}(X_t) - I_{Xt}))^2 + \lambda \Sigma_i (P_i - P_{ESTi})^2$$

wherein
- $P = P_1, P_2, \ldots, P_N$ and represents a set of vehicle poses;
- $P_i$ represents a pose of the vehicle at time i;

$X = X_1, X_2, \ldots, X_M$ and represents three-dimensional locations of track points in a scene;

$X_t$ represents a three-dimensional location of a track t in the scene;

R represents the rotation of the camera;

ρ denotes a robustifier function (e.g., a Cauchy robustifier);

T represents projection;

$I_{Xt}$ represents a fixed location in a given image, where a feature corresponding to track point $X_t$ was detected;

λ represents a weight used to trade off strength of a first and a second term in F; and $P_{EST_i}$ represents an initial or a previous pose estimate of the vehicle, and wherein the nonlinear function is used to optimize parameters P, X, and R.

25. The system of claim 24, further comprising:

an orientation correction module that corrects the orientations of the images by applying the correction parameter to the image data.

26. The system of claim 24, wherein the correction parameter is stored in the image database.

* * * * *

UNITED STATES PATENT AND TRADEMARK OFFICE
CERTIFICATE OF CORRECTION

PATENT NO. : 8,698,875 B2
APPLICATION NO. : 12/708302
DATED : April 15, 2014
INVENTOR(S) : Dragomir Anguelov et al.

Page 1 of 1

It is certified that error appears in the above-identified patent and that said Letters Patent is hereby corrected as shown below:

IN THE CLAIMS
Column 17, line 13, delete "trucks" and insert therefor --tracks--.

Signed and Sealed this
Twenty-sixth Day of January, 2016

Michelle K. Lee
*Director of the United States Patent and Trademark Office*